United States Patent
Shimoozono et al.

(10) Patent No.: US 9,883,113 B2
(45) Date of Patent: Jan. 30, 2018

(54) IMAGING PROCESSING APPARATUS AND METHOD OF IMAGING PROCESSING BY CONTROLLING AN IMAGING PERIOD

(71) Applicant: JVC KENWOOD Corporation, Yokohama-shi, Kanagawa (JP)

(72) Inventors: Akihito Shimoozono, Yokohama (JP); Etsuya Takami, Yokohama (JP)

(73) Assignee: JVC Kenwood Corporation, Kanagawa (JP)

( * ) Notice: Subject to any disclaimer, the term of this patent is extended or adjusted under 35 U.S.C. 154(b) by 0 days.

(21) Appl. No.: 15/341,092

(22) Filed: Nov. 2, 2016

(65) Prior Publication Data

US 2017/0054889 A1 Feb. 23, 2017

Related U.S. Application Data

(63) Continuation of application No. PCT/JP2015/082049, filed on Nov. 13, 2015.

(30) Foreign Application Priority Data

Jan. 16, 2015 (JP) ................... 2015-007183

(51) Int. Cl.
*H04N 5/235* (2006.01)
*H04N 5/232* (2006.01)
(Continued)

(52) U.S. Cl.
CPC ............. *H04N 5/2353* (2013.01); *G06T 7/20* (2013.01); *G06T 13/80* (2013.01); *H04N 5/238* (2013.01);
(Continued)

(58) Field of Classification Search
CPC .. H04N 5/2353; H04N 5/2357; H04N 9/8042; H04N 5/907; H04N 5/783;
(Continued)

(56) References Cited

U.S. PATENT DOCUMENTS 6,271,884 B1 * 8/2001 Chung ................... H04N 5/235
348/223.1
7,209,169 B2 * 4/2007 Matsumoto ............ H04N 5/235
348/226.1
(Continued)

FOREIGN PATENT DOCUMENTS

| JP | 2009-017293 | 1/2009 |
| JP | 2009-200726 | 9/2009 |
| JP | 2010-093601 | 4/2010 |

OTHER PUBLICATIONS

International Search Report for International Patent Application No. PCT/JP2015/082049 dated Feb. 2, 2016, 5 pages.
(Continued)

*Primary Examiner* — Tuan Ho
*Assistant Examiner* — Chan Nguyen
(74) *Attorney, Agent, or Firm* — Amin, Turocy & Watson, LLP

(57) ABSTRACT

There is provided an imaging processing apparatus comprising: an imaging period controller configured, when driving an imager with an exposure time less than a standard imaging period, to generate a frame of the standard imaging period every certain frames and to control an imaging period so that one of a preceding frame and succeeding frame of the frame of the standard imaging period has an imaging period shorter than the standard imaging period and the other has an imaging period longer than the standard imaging period; a shutter controller configured to control reset timing of electric charges accumulated in the imager in accordance with the imaging period of the imager; a storage configured to store therein taken images by the imager with the reset timing controlled; and a reading controller configured to
(Continued)

read and output the taken images stored in the storage with a reproduction speed corresponding to the standard imaging period.

4 Claims, 5 Drawing Sheets

(51) Int. Cl.
| | | |
|---|---|---|
| H04N 5/238 | (2006.01) | |
| G06T 7/20 | (2017.01) | |
| G06T 13/80 | (2011.01) | |
| H04N 5/76 | (2006.01) | |
| H04N 5/77 | (2006.01) | |
| H04N 5/783 | (2006.01) | |
| H04N 5/907 | (2006.01) | |
| H04N 9/804 | (2006.01) | |

(52) U.S. Cl.
CPC ............. *H04N 5/2357* (2013.01); *H04N 5/76* (2013.01); *H04N 5/772* (2013.01); *H04N 5/783* (2013.01); *H04N 5/907* (2013.01); *H04N 9/8042* (2013.01)

(58) Field of Classification Search
CPC .......... H04N 5/772; H04N 5/76; H04N 5/238; G06T 13/80; G06T 7/20
USPC .............................................. 348/226.1, 362
See application file for complete search history.

(56) References Cited

U.S. PATENT DOCUMENTS

| | | | |
|---|---|---|---|
| 8,279,302 B2* | 10/2012 | Han ................... | H01L 27/14601 348/222.1 |
| RE44,062 E * | 3/2013 | Kim ....................... | H04N 5/235 348/226.1 |
| 2006/0127084 A1* | 6/2006 | Okada ................ | H04N 5/23232 396/439 |

OTHER PUBLICATIONS

Written Opinion for International Patent Application No. PCT/JP2015/082049 dated Feb. 2, 2016, 5 pages.

* cited by examiner

IMAGING PROCESSING APPARATUS AND METHOD OF IMAGING PROCESSING BY CONTROLLING AN IMAGING PERIOD

CROSS-REFERENCE TO RELATED APPLICATIONS

This application is a continuation of PCT International Application No. PCT/JP2015/082049 filed on Nov. 13, 2015 which claims the benefit of priority from Japanese Patent Application No. 2015-007183 filed on Jan. 16, 2015, the entire contents of which are incorporated herein by reference.

BACKGROUND OF THE INVENTION

1. Field of the Invention

The present invention relates to an imaging processing apparatus and a method of imaging processing.

2. Description of the Related Art

Imaging apparatuses perform imaging in a constant imaging period conforming to a video standard such as the NTSC system and the PAL system. NTSC is the abbreviation of "National Television System Committee." PAL is the abbreviation of "Phase Alternating Line." Specifically, an imaging apparatus conforming to the NTSC system performs imaging in an imaging period of 1/60 second (although an imaging period of 1/59.94 second correctly, it is written as an imaging period of 1/60 second in this specification). An imaging apparatus conforming to the PAL system performs imaging in an imaging period of 1/50 second.

In recent years, with the prevalence of light-emitting diodes (LEDs), light sources of various kinds of display devices have changed from light bulbs to LEDs. As to signals, light-bulb signals have progressively been replaced by LED signals, for example. LED signals look as if they keep lighting to human eyes. However, LED signals are driven by alternating current power supplies (AC power supplies). Consequently, LED signals actually repeat fast blinking in a constant blinking period, although it is difficult for human eyes to perceive that. Conventional technologies are described in Japanese Patent Application Laid-open No. 2009-17293 and Japanese Patent Application Laid-open No. 2010-93601, for example.

When an LED signal that repeats blinking in such a constant blinking period is imaged by an imaging apparatus conforming to the video standard such as the NTSC system or the PAL system, exposure may occur during an unlit period of a blinking period of the LED signal depending on a shutter speed. In this case, even though the LED signal is actually lit, the LED signal on a taken image is in an unlit state.

In order to solve this problem, a technique is developed that images LED signals by exposure with an imaging period other than the video standard such as the NTSC system or the PAL system. This technique performs exposure with an imaging period other than the video standard, whereby it is difficult to output image signals conforming to the video standard such as the NTSC system or the PAL system. Consequently, the technique is far from being able to solve the above problem as an imaging apparatus.

Another technique is developed that performs imaging by combining exposures with different imaging periods to increase probability of exposuring of an LED signal in a lit state. However, this technique has a problem in that exposure timing is made irregular, whereby it is difficult to maintain the continuity of an image, leading to inability to obtain an image in which the movement of a moving body is smooth. In other words, the technique has a problem in that the movement of a moving body is discontinuous and the movement of the moving body is awkward.

SUMMARY

It is an object of embodiments to at least partially solve the problems in the conventional technology.

There is provided an imaging processing apparatus comprising: an imaging period controller configured, when driving an imager so as to image a subject with an exposure time less than a standard imaging period conforming to a certain video standard, to generate a frame of the standard imaging period every certain frames and to control an imaging period of the imager so that one of a preceding frame of the frame of the standard imaging period and a succeeding frame of the frame of the standard imaging period has an imaging period which is shorter than the standard imaging period and the other of them has an imaging period which is longer than the standard imaging period; a shutter controller configured to control reset timing of electric charges accumulated in the imager depending on an amount of light from the subject in accordance with the imaging period of the imager; a storage configured to store therein respective taken images imaged by the imager with the reset timing controlled; a phase corrector configured to detect a motion vector from a plurality of the taken images stored in the storage, to calculate a shift amount of the taken images relative to the standard imaging period, to generate frame interpolation images with respective pixels being shifted by the calculated shift amount in a direction corresponding to the detected motion vector, and to store the frame interpolation images in the storage; and a reading controller configured to read and output the respective taken images of the standard imaging period and the frame interpolation images stored in the storage with a reproduction speed corresponding to the standard imaging period.

There is provided a method of imaging processing comprising: by a drive period controller, when driving an imager so as to image a subject with an exposure time less than a standard period conforming to a certain video standard, generating a frame of the standard imaging period every certain frames and controlling an imaging period of the imager so that one of a preceding frame of the frame of the standard imaging period and a succeeding frame of the frame of the standard imaging period has an imaging period which is shorter than the standard imaging period and the other of them has an imaging period which is longer than the standard imaging period; by a shutter controller, controlling reset timing of electric charges accumulated in the imager depending on an amount of light from the subject in accordance with the imaging period of the imager; by a storage, storing therein respective taken images imaged by the imager with the reset timing controlled; by a phase corrector, detecting a motion vector from a plurality of the taken images stored in the storage, calculating a shift amount of the taken images relative to the standard imaging period, generating frame interpolation images with respective pixels being shifted by the calculated shift amount in a direction corresponding to the detected motion vector, and storing the frame interpolation images in the storage; and by a reading controller, reading and outputting the respective taken images of the standard imaging period and the frame interpolation images stored in the storage with a reproduction speed corresponding to the standard imaging period.

BRIEF DESCRIPTION

DETAILED DESCRIPTION OF THE PREFERRED EMBODIMENTS

Embodiments for implementation of an imaging apparatus according to the present application, will be described in detail with reference to the drawings.

First, the following describes a phenomenon in which even when an LED signal in a lit state is imaged, it is imaged as an LED in an unlit state depending on exposure timing. The LED signal repeats blinking in a blinking period half an alternating current power supply (AC power supply). LED signals in an area with a commercial power supply frequency of 50 Hz, or the eastern area of Japan (hereinafter, referred to as an "eastern Japan side") as an example repeat blinking in a blinking period of $1/100$ second, for example. LED signals in an area with a commercial power supply frequency of 60 Hz, or the western area of Japan (hereinafter, referred to as a "western Japan side") as an example repeat blinking in a blinking period of $1/120$ second.

Figure 1:
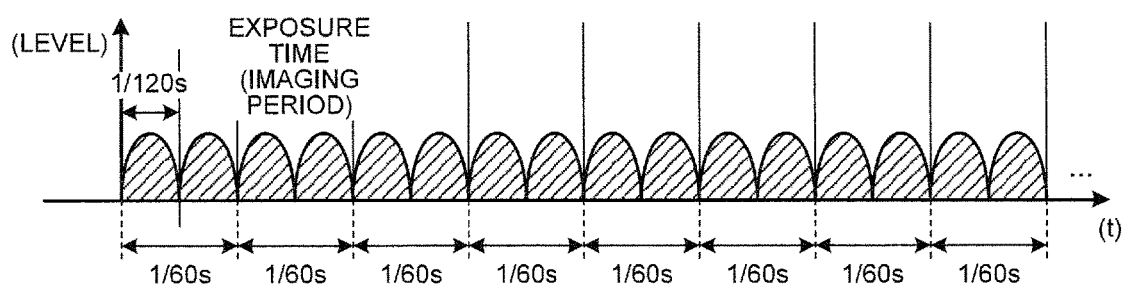
FIG. 1 is a diagram for illustrating changes in an imaging light amount when imaging start timing of an imaging apparatus and lighting start timing of an LED signal match.
Figure 2:
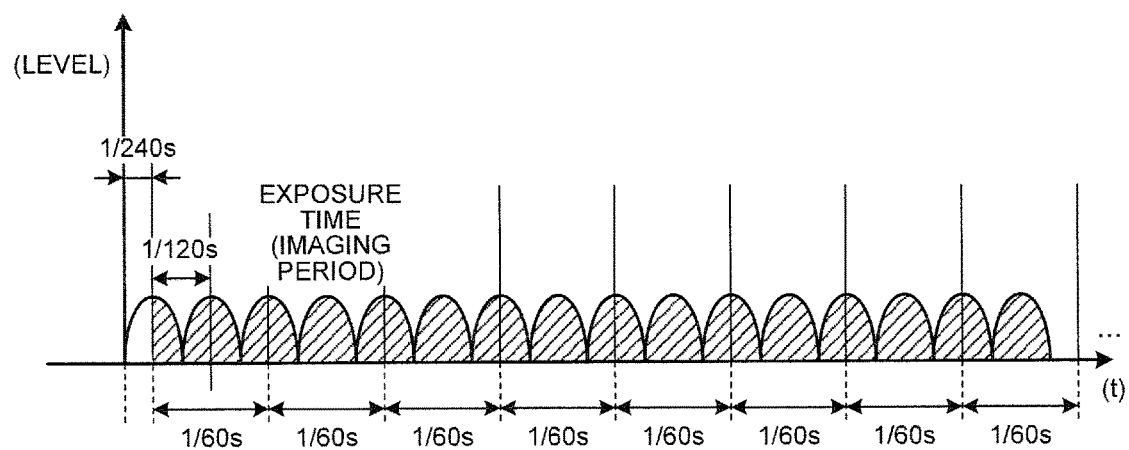
FIG. 2 is a diagram for illustrating changes in an imaging light amount when imaging by the imaging apparatus is started after a certain time has elapsed from the start of lighting of the LED signal.

FIG. 1 and FIG. 2 illustrate, when an LED signal of the western Japan side that repeats blinking in a blinking period of $1/120$ second is imaged by an imaging apparatus that performs imaging with a shutter speed of $1/60$ second conforming to the NTSC system, light amounts of the LED signal accumulated in the imaging apparatus. A period of $1/60$ second in the NTSC system corresponds to one vertical synchronization period (1VD). As to FIG. 1 and FIG. 2, FIG. 1 illustrates an example in which imaging corresponding to change twice in light amount of the LED signal blinking in a blinking period of $1/120$ second is performed during an exposure time of $1/60$ second of the imaging apparatus. In other words, FIG. 1 illustrates change in an imaging light amount when a start timing of imaging in the imaging apparatus coincides with a start timing of lighting in the LED signal. In contrast, FIG. 2 illustrates an example in which imaging by the imaging apparatus is started when a time of about $1/240$ second has elapsed after the start of lighting of the LED signal.

As can be seen by comparing FIG. 1 and FIG. 2, when the LED signal blinking in the blinking period of $1/120$ second is imaged with a shutter speed of $1/60$ second, the imaging light amount of the LED signal obtained during an exposure time of $1/60$ second is equal among respective imaging periods regardless of the imaging start timing.

Figure 3:
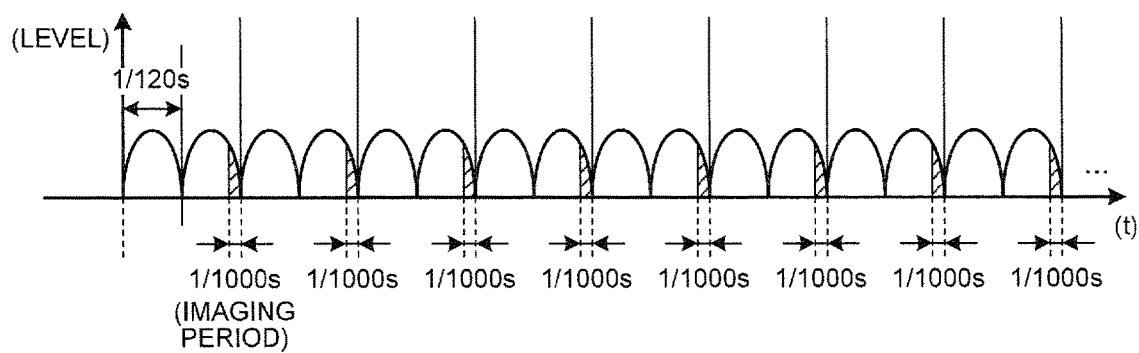
FIG. 3 is a diagram of an imaging light amount at a fast shutter when imaging end timing of the imaging apparatus and lighting end timing of the LED signal match.
Figure 4:
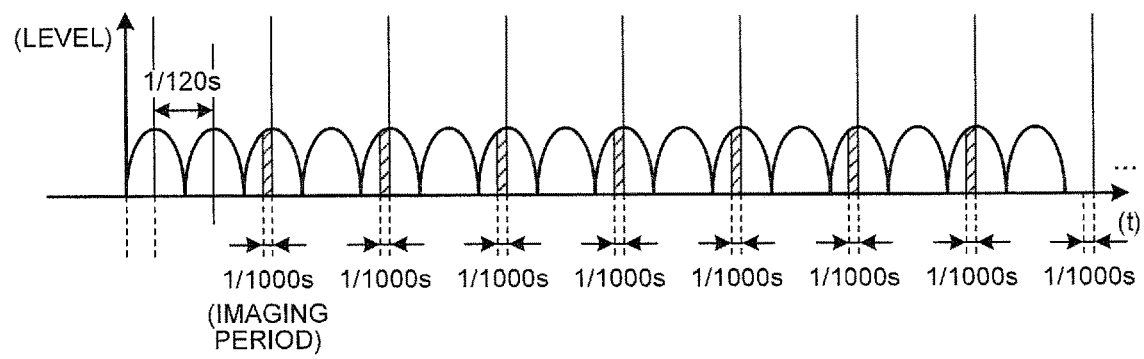
FIG. 4 is a diagram of an imaging light amount at the fast shutter when the imaging end timing of the imaging apparatus and the lighting end timing of the LED signal do not match.

FIG. 3 and FIG. 4 illustrate, when the LED that repeats blinking in the blinking period of $1/120$ second is imaged with a shutter speed of $1/1000$ (a fast shutter), that is, when imaging is performed with a shortened exposure time, light amount of the LED signal accumulated in the imaging apparatus. Also when imaging is performed by the fast shutter, the imaging period is $1/60$ second conforming to the NTSC system. As to the drawings, FIG. 3 illustrates the imaging light amount when an end timing of imaging in the imaging apparatus coincides with an end timing of lighting in the LED signal. A period of $1/1000$ second just before the end of imaging and the end of lighting, which is shown as the period hatched in FIG. 3, is an imaging period.

In contrast, FIG. 4 illustrates the imaging light amount when the end timing of imaging in the imaging apparatus does not coincide with the end timing of lighting in the LED signal. Specifically, the example in FIG. 4 is an example in which a time point at which about $1/240$ second has elapsed after a start of lighting in the LED signal corresponds to the end timing of imaging in the LED signal. In this example in FIG. 4, a period of $1/1000$ second just before the time point at which about $1/240$ second has elapsed after the start of lighting in the LED signal corresponds to an imaging period.

As can be seen by comparing the respective imaging periods in FIG. 3 and FIG. 4, it is revealed that the imaging light amount is larger in the case (FIG. 4) in which the time point at which about $1/240$ second has elapsed after the start of lighting in the LED signal corresponds to the end timing of imaging in the imaging apparatus than the case (FIG. 3) in which the end timing of imaging in the imaging apparatus coincides with the end timing of lighting in the LED signal match.

In other words, as described with reference to FIG. 1 and FIG. 2, when the LED signal blinking in the blinking period of $1/120$ second is imaged with the shutter speed of $1/60$ second corresponding to the one vertical synchronization period of the NTSC system, the imaging light amount corresponding to the one imaging period is equal between "the case in which the start timing of imaging in the imaging apparatus coincides with the start timing of lighting in the LED signal" and "the case in which the start timing of imaging in the imaging apparatus does not coincide with the start timing of lighting in the LED signal."

However, when the LED signal is imaged with a shutter speed making an exposure time less than the one vertical synchronization period such as $1/1000$ second, the imaging light amount corresponding to the one imaging period is different between "the case in which the start timing of imaging in the imaging apparatus coincides with the start timing of lighting in the LED signal match" and "the case in which the start timing of imaging in the imaging apparatus does not coincide with the start timing of lighting in the LED signal."

When the LED signal is imaged with the shutter speed making the exposure time less than the one vertical synchronization period, the imaging light amount corresponding to the one imaging period is smaller in "the case in which the start timing of imaging in the imaging apparatus coincides with the start timing of lighting in the LED signal match" than "the case in which the start timing of imaging in the imaging apparatus does not coincide with the start timing of lighting in the LED signal."

In other words, when an LED signal that repeats blinking in an integral multiple of an imaging period (an exposure period: a shutter speed) of the imaging apparatus is imaged with the fast shutter (the exposure time less than the one vertical synchronization period), it may be difficult for the imaging apparatus to accumulate light amount of the LED signal in a lit state depending on imaging timing. When it is difficult for the imaging apparatus to accumulate the light amount, inconvenience occurs in which even though the LED signal in a lit state is imaged, the LED signal is displayed in an unlit state on the image. For this reason, it is difficult for a drive recorder apparatus that is required to record surrounding circumstances during driving and also to accurately record a lit color of a signal to provide such an imaging apparatus.

Figure 5:
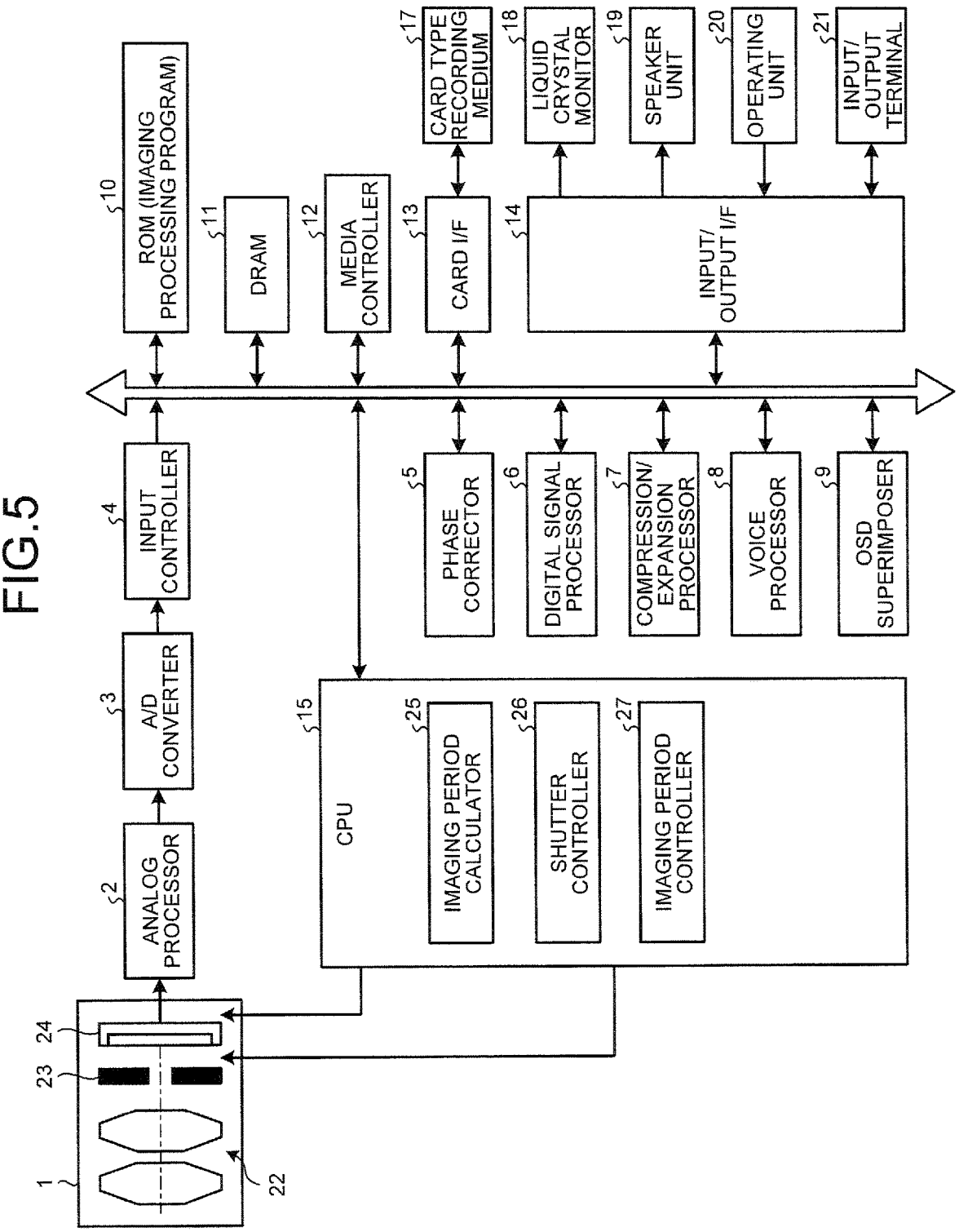
FIG. 5 is a block diagram of an imaging apparatus as an embodiment.

The imaging apparatus of the embodiment resolves the problem that the LED signal in a lit state is displayed as the LED signal in an unlit state on the image at the fast shutter that performs imaging with an exposure time less than a standard imaging period of the imaging apparatus as follows. First, FIG. 5 illustrates a block diagram of the imaging apparatus of the embodiment. As illustrated in FIG. 5, the imaging apparatus of the embodiment includes an imager 1, an analog processor 2, an A/D converter 3, an input controller 4, a phase corrector 5, a digital signal processor 6, a compression/expansion processor 7, a voice processor 8, and an OSD superimposer 9. OSD is the abbreviation of "on screen display."

The imaging apparatus of the embodiment also includes a ROM 10, a DRAM 11, a media controller 12, a card I/F 13, an input/output I/F 14, and a CPU 15. Components from the input controller 4 to the CPU 15 are connected to each other via a bus line 16. The DRAM 11 is an example of a storage.

A card type storage medium 17 such as an SD card (registered trademark) is installed to the card I/F 13. A liquid crystal monitor 18, a speaker unit 19, an operating unit 20, and an input/output terminal 21 are connected to the input/output I/F 14.

The imager 1 includes optical lenses 22 such as a concave lens and a convex lens, an iris 23 for adjusting an incident light amount, and an image sensor 24 that generates an imaging signal of a level corresponding to a received light amount of a subject. The image sensor 24 may be a CCD image sensor or a CMOS image sensor, for example. CCD is the abbreviation of a "charge coupled device." CMOS is the abbreviation of a "complementary metal oxide semiconductor."

The analog processor 2 removes noise from the imaging signal by correlated double sampling processing, for example. The A/D converter 3 digitizes the imaging signal with the noise removed. The input controller 4 transfers the digitized imaging signal to the digital signal processor 6 via the bus line 16. The digital signal processor 6 performs signal processing such as offset processing, white balance correction processing, gain control processing including sensitivity correction, gamma correction processing, reconstruction processing, or YC processing on the digitized imaging signal and writes the digitized imaging signal into the DRAM 11. "Y" is a luminance signal, whereas "C" is a color difference signal.

The imaging signal written into the DRAM 11 produces a phase shift in a time axial direction relative to exposure timing of the standard imaging period corresponding to an imaging period of the video standard due to exposure control with an irregular imaging period described later. The phase corrector 5 corrects the phase shift produced in the time axial direction. The imaging signal the phase shift of which has been corrected is displayed on the liquid crystal monitor 18. The imaging signal the phase shift of which has been corrected is subjected to compression processing into an imaging signal of certain image quality by the compression/expansion processor 7 and is supplied to the card I/F 13. The imaging signal supplied to the card I/F 13 is recorded in the card type storage medium 17 by the control of the media controller 12 together with voice signal generated by the voice processor 8, OSD images such as letters and figures generated by the OSD superimposer 9, and the like.

The imaging signal and the voice signal stored in the card type storage medium 17 is reproduced by the control of the media controller 12. The compression/expansion processor 7 performs expansion processing corresponding to the compression processing performed on the imaging signal and the voice signal to reproduce the imaging signal and the voice signal. The reproduced voice signal is supplied to the speaker unit 19 via the input/output I/F 14. The reproduced imaging signal is displayed on the liquid crystal monitor 18 and is output to the outside via the input/output terminal 21.

The ROM 10 stores therein an imaging processing program that performs imaging by the exposure control with the irregular imaging period described later and corrects the phase shift produced in the image and outputting the image, in addition to a system program such as an operating system (OS). The CPU 15 executes the imaging processing program to function as an imaging period calculator 25, a shutter controller 26, and an imaging period controller 27. Although this example will be described on the promise that the imaging period calculator 25, the shutter controller 26 and the drive period controller 27 are implemented by software, the whole or part of them may be implemented by hardware.

The imaging processing program may be recorded and provided in a computer-readable storage medium such as a compact disc read only memory (CD-ROM) or a flexible disk (FD) as an installable or executable file. The imaging processing program may be recorded and provided in a computer-readable storage medium such as a compact disc recordable (CD-R), a DVD, a Blu-ray Disc (registered trademark), or a semiconductor memory. DVD is the abbreviation of "digital versatile disc." The imaging processing program may be provided via a network such as the Internet. The imaging apparatus may download the imaging processing program via a network, install the program therein, and execute the program.

When performing imaging by the fast shutter that performs the exposure less than the one vertical synchronization period, the imaging apparatus causes the CPU 15 to read the imaging processing program stored in the ROM 10. The CPU 15 functions as the imaging period calculator 25, the shutter controller 26, and the drive period controller 27 to drive the image sensor 24 in an irregular imaging period so that an integral multiple of an imaging (exposure) period will not synchronize with a blinking period of the LED signal.

Figure 6:
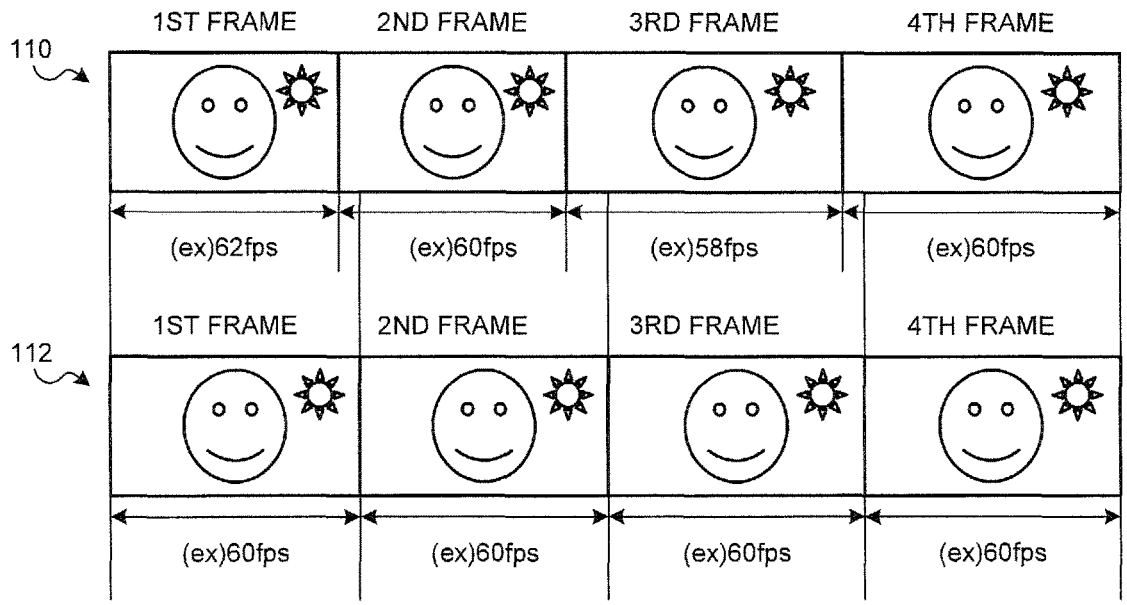
FIG. 6 is a diagram for illustrating an irregular imaging period of an image sensor in the imaging apparatus as the embodiment.

FIG. 6 is a diagram for illustrating the irregular imaging period of the image sensor 24. A pattern 110 in FIG. 6 illustrates respective taken images imaged by the image sensor 24 in respective imaging periods irregularly controlled. A pattern 112 in FIG. 6 illustrates respective taken images that are once stored in the DRAM 11, that are read from the DRAM 11 with a standard reproduction speed of the video standard such as the NTSC system, and that are output. FIG. 6 is an example in which 1/60 frame/second (fps) of the NTSC system is standard imaging period.

As illustrated in the pattern 110 in FIG. 6 as an example, at the fast shutter (the exposure less than the one vertical synchronization period), in a 1st frame, the drive period controller 27 drives the image sensor 24 in an irregular imaging period of 62 fps, which is a faster imaging period than the imaging period of 60 fps as the standard of the NTSC system. In the following 2nd frame, the drive period controller 27 drives the image sensor 24 in the imaging period of 60 fps as the standard of the NTSC system. In the following 3rd frame, the drive period controller 27 drives the image sensor 24 in an irregular imaging period of 58 fps, which is a slower imaging period than the imaging period of 60 fps as the standard of the NTSC system. In the following 4th frame, the drive period controller 27 drives the image sensor 24 in the imaging period of 60 fps as the standard of the NTSC system.

The drive period controller 27 causes the irregular imaging period of the image sensor 24 to coincide with the standard imaging period of the video standard every four standard imaging periods (every four vertical synchronization periods) in order to conform to the video standard such as the NTSC system. In other words, the drive period controller 27 adjusts an imaging period of a preceding frame of the irregular imaging period and an imaging period of a succeeding frame of the irregular imaging period which are adjacent to a frame driven in the standard imaging period such as the imaging period of 60 fps as the standard of the NTSC system in the image sensor 24 so that a total period of the imaging period of the preceding frame and the imaging period of the succeeding frame corresponds to a period double the standard imaging period.

In the example illustrated in FIG. 6, the 2nd frame and the 4th frame are the frames of the standard imaging period. In other words, the drive period controller 27 drives the image sensor 24 so as to have the frame of the standard imaging period every other frame. The drive period controller 27 drives the image sensor 24 so that the 1st frame corresponding to the preceding frame of the 2nd frame of the standard imaging period will have the irregular imaging period of 62 fps and then drives the image sensor 24 so that the 3rd frame corresponding to the succeeding frame of the 2nd frame will have the irregular imaging period of 58 fps. With this operation, "62 fps (the 1st frame)+58 fps (the 3rd frame)=60 fps×2 (the 2nd frame+the 4th frame)", whereby the irregular imaging period of the image sensor 24 can coincide with the imaging period of the video standard at a timing of four standard imaging periods.

Respective imaging signals of the subject imaged in the irregular imaging period and the standard imaging period are stored in the DRAM 11 via the analog processor 2, the A/D converter 3, and the input controller 4. The CPU 15 reads the respective imaging signals corresponding to the irregular imaging period and the standard imaging period stored in the DRAM 11 at a reading speed of 60 fps conforming to the NTSC system as illustrated in the pattern 112 in FIG. 6. The imaging signals read at the reading speed of 60 fps are supplied to the liquid crystal monitor 18 via the input/output I/F 14 and are output to the outside via the input/output terminal 21.

The respective imaging signals corresponding to the irregular imaging period and the standard imaging period stored in the DRAM 11 are subjected to compression processing into an imaging signal with an image quality of 30 fps, which is an image quality half that of the standard image quality by the compression/expansion processor 7 and are recorded in the card type storage medium 17 together with voice data, the OSD images, and the like.

Figure 7:
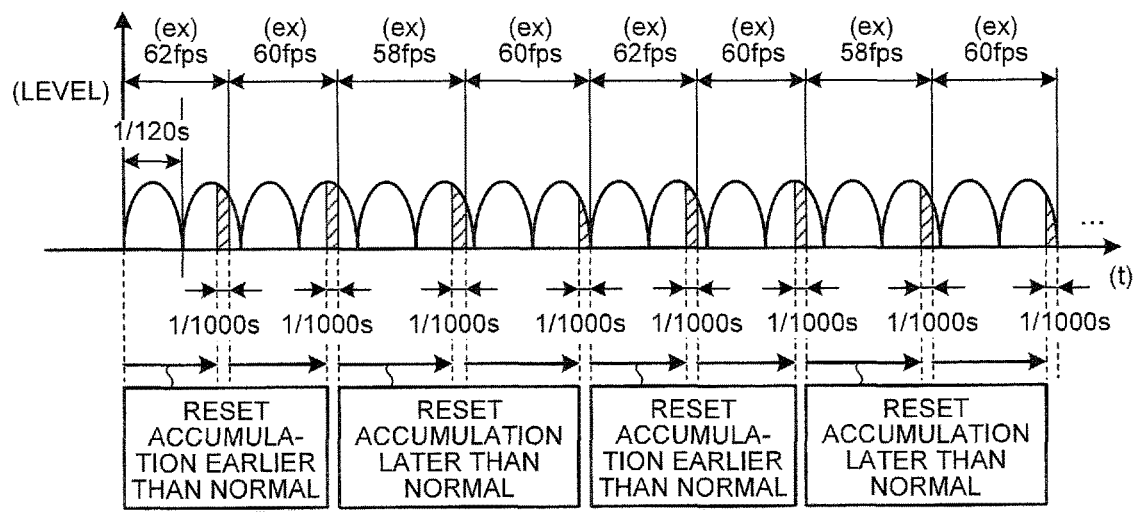
FIG. 7 is a diagram of relation between a blinking period of the LED signal and shutter timing (accumulation reset timing) at the fast shutter of the imaging apparatus as the embodiment.

FIG. 7 illustrates relation between the blinking period of the LED signal and shutter timing (accumulation reset timing) at the fast shutter. The accumulation reset timing is an example of reset timing. In the imaging apparatus of the embodiment, at the fast shutter, the imaging period of the image sensor 24 irregularly expands and contracts as described with reference to the pattern 110 in FIG. 6. An electronic shutter speed of the image sensor 24 is controlled by controlling the accumulation reset timing of the image sensor 24. Given this situation, the accumulation reset timing is controlled in accordance with the imaging period of the image sensor 24.

Specifically, at the fast shutter, the imaging period calculator 25 calculates corrected accumulation reset timing, which is the accumulation reset timing corresponding to the respective irregular imaging periods, using the following (Numerical Formula 1).

The corrected accumulation reset timing [ms]=the normal accumulation reset timing [ms]+(the irregular imaging period of the image sensor 24 [ms]−the standard imaging period of the image sensor 24 [ms])     (Numerical Formula 1)

The shutter controller 26 resets electric charges (the imaging signal) accumulated in the image sensor 24 at the corrected accumulation reset timing calculated by the imaging period calculator 25 in the irregular imaging period controlled by the drive period controller 27. With this operation, as illustrated in FIG. 7, in the imaging period of 62 fps faster than the standard imaging period, the image sensor 24 is controlled to be reset earlier than the standard imaging period in accordance with this imaging period of 62 fps. FIG. 7 shows an example of the fast shutter of 1/1000 second. In the imaging period of 58 fps slower than the standard imaging period, the image sensor 24 is controlled to be reset later than the standard imaging periods in accordance with this imaging period of 58 fps.

With this operation, as is hatched in FIG. 7, the image sensor 24 is exposed at different timing for each imaging period to detect light from the LED signal. This means that the electric charges accumulated in the image sensor 24 increase or decrease for each imaging period. Consequently, the LED signal in a lit state can be displayed in most cases, and the inconvenience that the LED signal in a lit state is always displayed as an unlit state (the inconvenience of being displayed as an unlit state continuously) can be prevented, although the LED signal in a lit state may be displayed as an unlit state may depending on exposure timing.

In the imaging period of the one vertical synchronization period or more (a slow shutter) as in the imaging period of 58 fps illustrated in FIG. 6 and FIG. 7, there is a problem in that the imaging period (interval) largely changes, and a moving object in an image is more discontinuous than in the imaging period less than the one vertical synchronization period (the fast shutter). For this reason, for the imaging period longer than the blinking period of the LED signal, the image sensor 24 is preferably driven in the normal imaging period. In the above example, at the imaging drive period of 58 fps, the image sensor 24 is controlled to be reset at the timing of 60 fps as the standard imaging period. With this operation, the inconvenience that the moving object in the image is discontinuous for the imaging period of the one vertical synchronization period or more can be reduced.

When exposure is performed by driving the image sensor 24 in the irregular imaging period as described above, phase shift in timing occurs relative to the exposure timing with the standard imaging period corresponding to the imaging period of the video standard. Given this situation, the phase corrector 5 illustrated in FIG. 5 corrects the phase of an image the exposure timing of which has been shifted in the time axial direction. Although the phase corrector 5 is illustrated as hardware in FIG. 5, it may be implemented in a software manner as a function of the CPU 15 by the imaging processing program stored in the ROM 10.

Specifically, the exposure of the irregular imaging period of 58 fps is slower than the exposure timing of 60 fps as the standard imaging period by about 0.574 second, for example. The phase corrector 5 detects a motion vector of imaging signal of each of two consecutive frames stored in the DRAM 11. The motion vector can be detected using a general block matching technique such as Sum of Absolute Difference (SAD) that detects absolute values of differences between respective pixels within a certain block of a taken image of each frame and evaluates the sum of the absolute values to be as an evaluation value for coincidence level of the respective pixels.

The phase corrector 5 performs a calculation of "0.574 second/($1/60$) second=0.574/16.666=0.034 (3.4%)" to calculate a shift amount relative to a taken image of the standard imaging period. The phase corrector 5 then creates an image in which the respective pixels are shifted by the calculated shift amount in a direction corresponding to the detected motion vector (frame interpolation processing).

Figure 8:
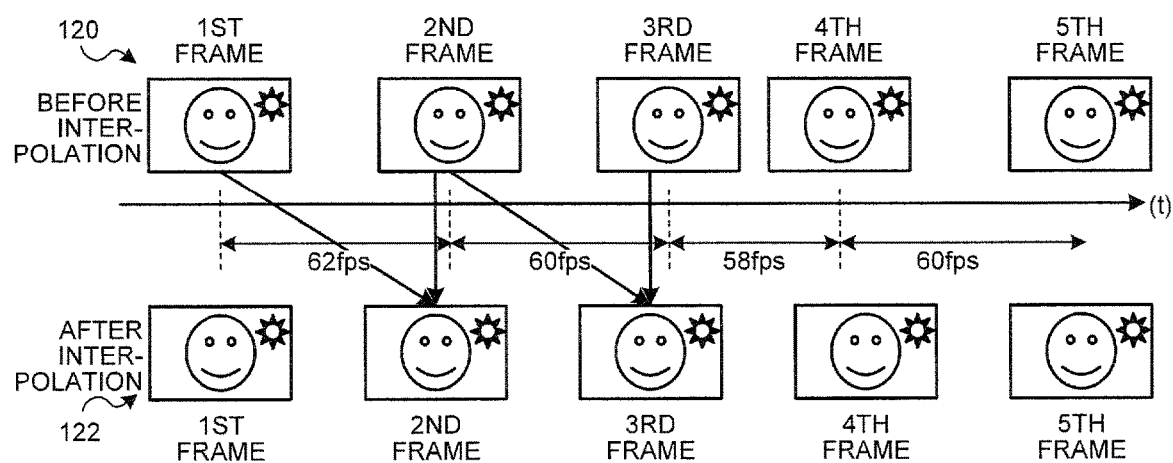
FIG. 8 is a schematic diagram for illustrating frame interpolation processing in the imaging apparatus as the embodiment.

FIG. 8 is a schematic diagram for illustrating the frame interpolation processing. A pattern 120 in FIG. 8 illustrates taken images before the frame interpolation processing (the taken images stored in the DRAM 11). A pattern 122 in FIG. 8 illustrates taken images after the frame interpolation processing. As can be seen from FIG. 8, the phase corrector 5 detects the motion vector as described above from the taken images of the 1st frame and the 2nd frame stored in the DRAM 11. The phase corrector 5 performs a calculation of "a difference in period between the 1st frame and the 2nd frame/16.666" to calculate the shift amount relative to the taken image of the standard imaging period. The phase corrector 5 shifts the respective pixels of a taken image of the 2nd frame by the calculated shift amount in a direction corresponding to the detected motion vector to create a frame interpolation image.

Similarly, the phase corrector 5 detects the motion vector as described above from the taken images of the 2nd frame and the 3rd frame stored in the DRAM 11. The phase corrector 5 performs a calculation of "a difference in imaging period between the 2nd frame and the 3rd frame/16.666" to calculate the shift amount relative to the taken image of the standard imaging period. The phase corrector 5 shifts the respective pixels of a taken image of the 3rd frame by the calculated shift amount in a direction corresponding to the detected motion vector to create a frame interpolation image and store the frame interpolation image in the DRAM 11.

With this operation, the frame interpolation can be performed so as to cancel out the shift by the exposure with the irregular imaging periods for the detected motion vector. Consequently, phase adjustment and correction for the taken images exposed in the irregular periods can be performed in the time axial direction, continuity of a moving object in an image can be held, and the moving object smoothly moving can be displayed.

The CPU 15 as an example of a reading controller reads the taken images of the standard imaging period (the taken image of the 1st frame and the like) and the frame interpolation images (the taken image of the 3rd frame and the like) stored in the DRAM 11 by reproduction speed of 60 fps corresponding to the standard imaging period, outputs the taken images of the standard imaging period and the frame interpolation images to the liquid crystal monitor 18, and outputs the taken images of the standard imaging period and the frame interpolation images to the outside via the input/output terminal 21.

As is clear from the above description, the imaging apparatus of the embodiment operates as follows:
1. The image sensor 24 is driven in a plurality of irregular imaging periods.
2. The image sensor 24 is driven in the standard imaging period conforming to the video standard between the irregular imaging periods of the image sensor 24.
3. The imaging period of the image sensor 24 is coincided with the standard imaging period of the video standard for a certain period such as every four vertical synchronization periods.
4. The shutter speed of the image sensor 24 is adjusted (the accumulation reset timing is corrected) in accordance with the irregular imaging period to adjust an exposure level.
5. For the shutter speed (exposure time) shorter than the blinking period of the LED signal (the fast shutter (the exposure less than the one vertical synchronization period)), the image sensor is driven in the irregular imaging period. For the shutter speed (exposure time) longer than the blinking period of the LED signal (the slow shutter (the exposure more than the one vertical synchronization period)), the image sensor is driven in the standard imaging period.
6. Switching between the irregular imaging period and the standard imaging period of the image sensor 24 is performed in a period coinciding with the standard imaging period of the video standard.

With this operation, at the fast shutter (at the exposure less than the one vertical synchronization period), the LED signal is imaged at least in a state that blinking is repeated. Consequently, when the imaging apparatus of the embodiment is installed in a drive recorder, the LED signal in a lit state can be imaged as the LED signal in a lit state or a blinking state.

The imaging apparatus of the embodiment operates as follows:
1. An image phase is adjusted and corrected in the time axial direction for the taken images imaged with the exposure with the irregular imaging periods.
2. The motion vector is detected from the two consecutive frames. For the detection of the motion vector, a general block matching technique such as SAD is used.
3. The frame interpolation is performed for the detected motion vector so as to cancel out the shift by the exposure with the irregular imaging periods.

With this operation, the discontinuity of the image produced by driving the image sensor 24 in the irregular imaging period can be reduced, and the moving object which is smoothly moving can be displayed.

The above embodiment is disclosed by way of example only and does not intend to limit the scope of the present invention. This novel embodiment can be performed in other various forms, and various omissions, replacements, and alterations can also be performed without departing from the essence of the invention. Although the LED signal is imaged in the above embodiment, the present invention can achieve the above effect by imaging any device so long as it includes LEDs, for example. Embodiments and modifications of the embodiments are included in the scope and essence of the invention and are included in the inventions described in the claims and equivalents thereof.

The present invention can resolve the problem that when a LED in a lit state is imaged, the LED may be imaged as a LED in an unlit state due to exposure timing. Furthermore, the present invention can output an image with continuity of a moving object being maintained.

What is claimed is:

1. An imaging processing apparatus comprising:
   an imaging period controller configured, when driving an imager so as to image a subject with an exposure time less than a standard imaging period conforming to a certain video standard, to generate a frame of the standard imaging period every certain frames and to control an imaging period of the imager so that one of a preceding frame of the frame of the standard imaging period and a succeeding frame of the frame of the standard imaging period has an imaging period which is shorter than the standard imaging period and the other of them has an imaging period which is longer than the standard imaging period;
   a shutter controller configured to control reset timing of electric charges accumulated in the imager depending on an amount of light from the subject in accordance with the imaging period of the imager;
   a storage configured to store therein respective taken images imaged by the imager with the reset timing controlled;
   a phase corrector configured to detect a motion vector from a plurality of the taken images stored in the storage, to calculate a shift amount of the taken images relative to the standard imaging period, to generate frame interpolation images with respective pixels being shifted by the calculated shift amount in a direction corresponding to the detected motion vector, and to store the frame interpolation images in the storage; and
   a reading controller configured to read and output the respective taken images of the standard imaging period and the frame interpolation images stored in the storage with a reproduction speed corresponding to the standard imaging period.

2. The imaging processing apparatus according to claim 1, wherein the imaging period controller is configured to control the imaging period of the imager in a manner that a total period of the imaging period which is shorter than the standard imaging period and the imaging period which is longer than the standard imaging period corresponds to a period at least double the standard imaging period.

3. The imaging processing apparatus according to claim 1, further comprising an imaging period calculator configured to perform processing to add a time obtained by subtracting a time of the standard imaging period of the imager from a time of the imaging period of the imager controlled by the imaging period controller to a time of the reset timing of the standard imaging period to calculate reset timing corresponding to the imaging period controlled by the imaging period controller, wherein
   the shutter controller controls the reset timing of the imager with the reset timing calculated by the imaging period calculator.

4. A method of imaging processing comprising:
   by a drive period controller, when driving an imager so as to image a subject with an exposure time less than a standard period conforming to a certain video standard, generating a frame of the standard imaging period every certain frames and controlling an imaging period of the imager so that one of a preceding frame of the frame of the standard imaging period and a succeeding frame of the frame of the standard imaging period has an imaging period which is shorter than the standard imaging period and the other of them has an imaging period which is longer than the standard imaging period;
   by a shutter controller, controlling reset timing of electric charges accumulated in the imager depending on an amount of light from the subject in accordance with the imaging period of the imager;
   by a storage, storing therein respective taken images imaged by the imager with the reset timing controlled;
   by a phase corrector, detecting a motion vector from a plurality of the taken images stored in the storage, calculating a shift amount of the taken images relative to the standard imaging period, generating frame interpolation images with respective pixels being shifted by the calculated shift amount in a direction corresponding to the detected motion vector, and storing the frame interpolation images in the storage; and
   by a reading controller, reading and outputting the respective taken images of the standard imaging period and the frame interpolation images stored in the storage with a reproduction speed corresponding to the standard imaging period.

* * * * *